(12) United States Patent
Stratton (10) Patent No.: US 9,416,510 B2
(45) Date of Patent: Aug. 16, 2016

(54) METHOD OF CONTAINING A SPILL IN AN AQUEOUS ENVIRONMENT AND/OR A SPILL CONTAINMENT APPARATUS

(76) Inventor: Michael John Stratton, Hertfordshire (GB)

(*) Notice: Subject to any disclaimer, the term of this patent is extended or adjusted under 35 U.S.C. 154(b) by 222 days.

(21) Appl. No.: 14/124,605

(22) PCT Filed: Jun. 7, 2012

(86) PCT No.: PCT/GB2012/051281
§ 371 (c)(1),
(2), (4) Date: Mar. 24, 2014

(87) PCT Pub. No.: WO2012/168713
PCT Pub. Date: Dec. 13, 2012

(65) Prior Publication Data
US 2014/0197108 A1 Jul. 17, 2014

(30) Foreign Application Priority Data

Jun. 7, 2011 (GB) .................................. 1109517.1
Nov. 11, 2011 (GB) .................................. 1119473.5
Apr. 20, 2012 (GB) .................................. 1206963.9

(51) Int. Cl.
*E02B 15/06* (2006.01)
*E21B 43/01* (2006.01)
*E02B 15/08* (2006.01)

(52) U.S. Cl.
CPC ............. *E02B 15/06* (2013.01); *E02B 15/0835* (2013.01); *E21B 43/0122* (2013.01); *E02B 15/0814* (2013.01); *E02B 15/0821* (2013.01)

(58) Field of Classification Search
CPC ..... E02B 15/06; E02B 15/08; E02B 15/0814; E02B 15/0821; E02B 15/0835; E02B 15/0857; E21B 43/0122

USPC ......... 210/747.6, 170.05, 242.3, 923; 405/64, 405/66, 67, 68, 69
See application file for complete search history.

(56) References Cited

U.S. PATENT DOCUMENTS

| 3,533,240 A | * | 10/1970 | Lesh | E02B 3/062 405/68 |
| 3,703,811 A | * | 11/1972 | Smith | E02B 15/06 405/68 |
| 3,839,870 A | * | 10/1974 | Ryan | E02B 15/08 405/64 |
| 4,573,426 A | * | 3/1986 | Larsson | E02B 15/08 405/68 |

(Continued)

FOREIGN PATENT DOCUMENTS

DE 76 04 627 U1 6/1976
DE 7604627 U1 6/1976

(Continued)

OTHER PUBLICATIONS

Machine translation of FR 2 961 832, Dec. 2011.*

(Continued)

*Primary Examiner* — Christopher Upton
(74) *Attorney, Agent, or Firm* — Muncy, Geissler, Olds & Lowe, P.C.

(57) ABSTRACT

A method of containing a spill in an aqueous environment, comprises the steps of: placing a polymeric pipe under the surface level of the aqueous environment in the vicinity of a site of potential spillage; and raising the pipe from under the surface level to a containment level; wherein the pipe forms, when raised, at least a partial boundary around the spill for containing the spill.

20 Claims, 8 Drawing Sheets

(56) References Cited

U.S. PATENT DOCUMENTS

| | | | | |
|---|---|---|---|---|
| 5,020,940 A * | 6/1991 | Smith | ............... | E02B 15/08 |
| | | | | 405/68 |
| 5,810,512 A | 9/1998 | Kateley | | |
| 6,517,726 B2 * | 2/2003 | Allen | ............... | E02B 15/06 |
| | | | | 210/242.3 |
| 6,695,535 B1 * | 2/2004 | Lazes | ............... | E02B 15/08 |
| | | | | 210/923 |
| 7,134,807 B2 * | 11/2006 | Dreyer | ............... | E02B 15/08 |
| | | | | 405/64 |

FOREIGN PATENT DOCUMENTS

| | | | |
|---|---|---|---|
| FR | 2 279 889 | A2 | 2/1976 |
| FR | 2279889 | A2 | 2/1976 |
| FR | 2301638 | A1 | 9/1976 |
| FR | 2961832 | * | 12/2011 |
| GB | 1486976 | A | 9/1977 |
| GB | 2482286 | * | 2/2012 |
| WO | 2005042851 | A2 | 5/2005 |

OTHER PUBLICATIONS

Search Report issued from the UK Intellectual Property Office issued in GB1119473.5 dated Nov. 28, 2011.

International Search Report and Written Opinion issued in PCT/GB12/051281 dated Sep. 19, 2013.

International Search Report—PCT/GB12/051281—International Searching Authority, EPO (Sep. 19, 2013).

* cited by examiner

METHOD OF CONTAINING A SPILL IN AN AQUEOUS ENVIRONMENT AND/OR A SPILL CONTAINMENT APPARATUS

CROSS-REFERENCE TO RELATED APPLICATIONS

This application is the U.S. National Stage Entry under 35 U.S.C. §371 of International Application No. PCT/GB2012/051281, filed on Jun. 7, 2012, which claims priority to GB Patent Application No. 1109517.1, filed on Jun. 7, 2011, GB Patent Application No. 1119473.5, filed Nov. 11, 2011, and GB Patent Application No. 1206963.9, filed Apr. 20, 2012.

FIELD OF THE INVENTION

The invention relates to methods of containing a spill in an aqueous environment and/or spill containment apparatuses.

BACKGROUND TO THE INVENTION

In the event of oil spills, seeps, releases of liquid petroleum hydrocarbon into aqueous environments (such as oceans, coastal waters, lakes, estuaries, rivers, etc.) various systems are currently available to try to contain spills when and wherever they occur. These systems generally include booms that are often brought on site after the event and placed in a configuration suitable for containing spills. The process of placing these booms at the site of spillage is essentially reactive and the scale of the potential damage to the environment can be best illustrated in recent high profile incidents. Any system which can provide improvements in terms of rapidity of deployment and efficacy of containment would constitute a significant technical advance in protecting the environment. One of the objectives of the invention is to provide one or more technical advances over existing booms and their deployment methods.

The following prior art documents are acknowledged: FR2301638, GB1486976, U.S. Pat. No. 5,810,512, and WO2005/042851.

SUMMARY OF THE INVENTION

In a first broad independent aspect, the invention provides a method of containing a spill in an aqueous environment, comprising the steps of:
  placing an inherently buoyant polymeric pipe under the surface level of said aqueous environment in the vicinity of a site of potential spillage;
  holding said pipe under the surface level against its buoyancy by employing one of a tether, a ballast or a propeller; and
  raising said pipe under the effect of its buoyancy from under the surface level to a containment level; wherein said pipe forms, when raised, at least a partial boundary around said spill for containing said spill.

This configuration is particularly advantageous since it may be very rapidly deployed. In effect, the pipe would without the various means of positioning envisaged tend to rise to the surface. The means of positioning simply needs to be deployed for the pipe to protect a relatively large containment area. The method is ideally suited for very large containment areas and achieves relatively simple set up in contrast to any of the relatively small scale complex prior art systems.

In a subsidiary aspect, said pipe is attached to a tether and is raised solely by adjusting and/or detaching said tether.

In a subsidiary aspect, said pipe is attached to a ballast and is raised solely by separating said ballast from said pipe.

In a subsidiary aspect, said pipe is displaced by a propeller unit.

In a subsidiary aspect, said pipe incorporates a global positioning system.

In a further broad independent aspect, the invention provides a method of containing a spill in an aqueous environment, comprising the steps of:
  placing a polymeric pipe under the surface level of said aqueous environment in the vicinity of a site of potential spillage; and
  raising said pipe from under the surface level to a containment level; wherein said pipe forms, when raised, at least a partial boundary around said spill for containing said spill.

This method is particularly advantageous because it allows very rapid deployment in a potentially wide variety of spillage sites. The method may lend itself to the containment of spillages around submerged, semi-submerged, semi-submersible, floating, permanent target structures and/or installations located offshore. The method may also lend itself to the protection of the environment around a spillage site for vessels, tankers, and other moveable structures. This method may also lend itself to improve the rapidity with which marinas, ports, terminals and other such environmentally sensitive areas may be protected.

In a subsidiary aspect, the invention provides a method with the steps of providing means for sinking an otherwise buoyant pipe and sufficiently releasing or deactivating said means to allow said pipe to return to the surface.

The release of the means holding the pipe below the surface level may be controlled remotely.

In a subsidiary aspect, the pipe is rigid.

In a further subsidiary aspect, the pipe is self-propelled and/or incorporates remote control GPS Positioning.

In a further subsidiary aspect, the pipe is telescopically extendable.

In a further subsidiary aspect, the pipe incorporates a renewable power generator. The provision of a pipe also provides an improved form of barrier which can be lowered and/or raised in the water with great speed. The provision of the pipe is particularly advantageous due to its durability when exposed to environmental conditions such as difficult weather conditions, marine environments, waves, and a variety of chemicals.

In one optional configuration the pipe may be formed without any joints and/or welds as a continuous length of polymeric material. This would be particularly beneficial in removing areas of potential stress and strain concentration which could over time cause the pipe to otherwise fail.

In a subsidiary aspect, said pipe is raised by pumping a gas into said pipe to increase the buoyancy of said pipe. This configuration is particularly advantageous in order to adjust the position of the pipe in its aqueous environment. It also allows the raising and lowering of the pipe to be controlled by the rate in one embodiment by which the gas is pumped into the pipe. This method is therefore particularly advantageous in terms of control.

In a further subsidiary aspect, said pipe is attached to a tether and is raised by adjusting and/or detaching said tether. This configuration is particularly advantageous in terms of controlling the positioning of the pipe relative to the aqueous environment.

In a further subsidiary aspect, said pipe is attached to a ballast and is raised by separating said ballast from said pipe. This configuration is particularly advantageous because it would allow the pipe to sit beneath the surface level and to be readily and rapidly deployed to a containment level by relatively straightforwardly separating the pipe from the ballast. This configuration is particularly advantageous since it also allows the potential lowering of the pipe by the bringing together of a ballast and a pipe.

In a further subsidiary aspect, the pipe is raised by pumping a gas into the pipe which is inert relative to a hydrocarbon which has been contained. This configuration is particularly advantageous because it reduces any potential risk of the gas used in the pumping process being part of the combustion equation of the hydrocarbon which is thought to be contained.

In a further subsidiary aspect, said pipe is disposed to form a ring around a site of potential spillage. The provision of a tubular pipe is particularly advantageous when formed into a ring since it provides a circumferential boundary for containing a spill.

In a further subsidiary aspect, said pipe contains, at least in part, dispersants and/or bioremediation and/or treatment agents serving to disperse and/or biodegrade and/or treat spills, and wherein said method comprises the steps of storing said agents in said pipe and distributing said agents from said pipe to said spillage site. This configuration is also particularly advantageous in terms of further improving the speed with which the containment apparatus is deployed but also in terms of the speed with which the hazardous materials might be treated.

In a further subsidiary aspect, the method comprises the step of deploying a skirt below the pipe. This configuration is particularly advantageous in reducing the risk of loss of product to open waters and will further assist in spillage recovery.

In a further subsidiary aspect, the method comprises the step of extruding the pipe in one continuous length. This is particularly advantageous in terms of reducing weak points and/or regions.

In a further subsidiary aspect, the method comprises the step of providing an inner tube in said pipe and inflating said inner tube. In a preferred embodiment, the inflatable inner tube might be of neoprene or other similar material.

In a further subsidiary aspect, the method comprises the step of evacuating fluid from said pipe as the inner tube is inflated.

In a further subsidiary aspect, the method comprises the step of providing a secondary pipe located in said pipe.

In a further subsidiary aspect, the method comprises the step of filling the annulus formed between said pipe and said secondary pipe with dispersants and/or bioremediation and/or treatment agents.

In a further subsidiary aspect, the contents of said pipe are pumped out through one way valves.

In a further subsidiary aspect, the method further comprises the step of heating the contents of said pipe.

In a further subsidiary aspect, said heating is provided by an inner pipe.

In a further broad independent aspect, the invention provides a spill containment apparatus for use in an aqueous environment, comprising a polymeric pipe of a diameter greater than 300 mm; said pipe having at least one inlet and at least one outlet; said pipe being of sufficient length to form a containment boundary and at least one pump for pumping a gas into said pipe through said inlet; whereby the buoyancy of said pipe may be adjusted. This configuration is particularly advantageous in terms of rapidly adjusting the position of the containment apparatus from a position beneath the water level to a position of containment. It also allows the containment apparatus to remain at a particular site for rapid deployment when required.

In a further broad independent aspect, the invention provides a spill containment apparatus for use in an aqueous environment, comprising a polymeric pipe of a diameter greater than 300 mm; said pipe being of sufficient length to form a containment boundary; a tether for securing said pipe under the surface level of said aqueous environment; and means for adjusting and/or removing said tether for placing said pipe at the surface level of said aqueous environment. This configuration is particularly advantageous for controllably and rapidly deploying the containment boundary.

In a further broad independent aspect, the invention provides a spill containment apparatus for use in an aqueous environment, comprising a polymeric pipe of a diameter greater than 300 mm; said pipe being of sufficient length to form a containment boundary; a detachable ballast for maintaining said pipe under the surface level of said aqueous environment; and means for separating said ballast from said pipe; whereby said pipe is raised to a surface level of said aqueous environment. This configuration is particularly advantageous because it allows the very rapid deployment of the containment apparatus in the event of a spill. It may also potentially be deployed without any powered mechanism which would reduce the risk of sparks and other potentially hazardous circumstances.

In a subsidiary aspect, the pipe is not filled or may be partially filled such that positive buoyancy of the apparatus is maintained (i.e. it might be always trying to surface). In this configuration, the pipe may be held below the surface of the water in its standby position by a remotely controlled arrangement of tethers which may included the anchor system of the target structure where appropriate. Alternatively, the tethers may be secured onto the sea bed using a similar control system. This method of deployment would mean that the apparatus may not require any special system to evacuate the pipe to make it surface. When it is required it could be released remotely through the tether control system and the pipe's natural buoyancy would ensure that it surfaces. The tethers may then act as the pipe's anchors ensuring it remains in the correct place during use. The pipe may be either full of air or advantageously nitrogen or something similar or it could be partially filled with a chemical dispersant. The tether control system may be employed to return the pipe to its guardian standby position.

In a further subsidiary aspect, the invention provides a valve and control system at one or more locations around the pipe which can be used for controlling the flooding or floating of the boom during deployment and re-setting. This valve system could be used to continue to control the delivery of the chemical dispersant by being connected to a tank or vessel containing a delivery or control system. This valve system may also aid the control of the pipe whilst it is deployed by increasing or reducing the buoyancy of the pipe as required by the nature of the incident. This valve system could also advantageously be used to operate in reverse to aid the collection of the crude oil (or similar product) which has been corralled by the pipe. This would be achieved by "sucking" the oil (or similar product) back through the control valve system to a collection vessel so that the oil (or similar product) is then retrieved and not dispersed.

In summary, the system may in certain embodiments not only protect but be instrumental in dispersing and collecting the spillage so minimising the environmental impact of the incident from whatever is being released into the sea.

The skirt which is used to aid the containment of the oil (or similar product) may not only be below the surface of the boom but it could also be in certain embodiments above the water line too. This would depend on the nature of the design required by the structure and the conditions it is operating in and the type of product the pipe is containing.

In a further subsidiary aspect, a continuous length of the polymeric pipe forms an arc. This configuration is particularly advantageous because it allows an opening to be formed between opposite extremities of the pipe which might allow vessels to enter the spillage site for treatment purposes or other purposes as appropriate.

In a further subsidiary aspect, a continuous length of polymeric pipe forms a ring. This configuration is particularly advantageous since it provides a potential full encirclement of a spillage site.

In a further subsidiary aspect, said pipe incorporates a proximal and a distal extremity with corresponding closure caps. In a particularly advantageous configuration, the closure caps are welded to the pipe. The weld lines between the closure caps and the pipe might be the only weld lines in an otherwise continuously extruded pipe.

In a further subsidiary aspect, said pipe incorporates a fire-retardant coating. This configuration is particularly advantageous should the boundary have to withstand burning hydrocarbon.

In a further subsidiary aspect, a skirt is provided beneath the pipe. This configuration is particularly advantageous to further reduce the risk of leakage beyond the boundary formed by the pipe.

In a further subsidiary aspect, said pipe forms rings with an opening means at a location of said circumference for opening said ring. This configuration is particularly advantageous because it allows the apparatus to be selectively opened or closed dependent upon the usage envisaged.

In a further subsidiary aspect, said pipe incorporates a storage compartment for storing dispersants and/or bioremediation and/or treatment agents serving to disperse, and/or biodegrade and/or treat spills. This configuration is particularly advantageous because it allows agents of this kind to be most rapidly deployed if necessary.

In a further subsidiary aspect, said pipe incorporates a pump for extracting said agents from said storage compartment. This configuration is particularly advantageous in order to allow the agents to be rapidly deployed in the site of the spill.

In a further subsidiary aspect, the apparatus further comprises a control system switching ON/OFF said pump dependent upon one or more of the following measurements: position relative to the potential spill site, depth below sea-level, temperature, pressure and measured air and/or water quality at the potential spill site. This configuration is particularly advantageous in terms of providing accurate yet rapid control of the position and/or deployment of the apparatus.

In a further subsidiary aspect, said apparatus incorporates a plurality of rings of pipe located concentrically. This configuration is particularly advantageous in terms of providing a barrier for containing spillage which has a lower risk of leakage into the surrounding environment.

In a further subsidiary aspect, said apparatus incorporates a plurality of pipes at least one of which being located radially within another. This configuration is particularly advantageous in terms of protection in the case of leakage through the wall of an outer pipe, for example. It is also particularly advantageous when the space between an inner and an outer pipe is provided for a first kind of treatment agent and the space within the inner pipe is provided for a further agent. In this circumstance, mixing of the two agents may be facilitated for a synergistic treatment of the hydrocarbon or other hazardous compound present at the spillage site.

In a further subsidiary aspect, the polymeric pipe is of polyethylene (PE). In a further subsidiary aspect, the pipe is of PE100. In a further subsidiary aspect, the PE pipe has a solid wall with a density of 0.95 to 0.96 kg/dm3. This selection of material is particularly advantageous since it allows the pipe to be inherently buoyant in order to be readily deployed.

In a further subsidiary aspect, the polymeric pipe may be used in the process as a storage compartment for retaining and collecting hazardous spillages. In a further subsidiary aspect, mechanisms may be provided to avoid the loss of product to open waters and to aid spillage recovery.

In a further subsidiary aspect, multiple rows of polymeric pipe may be employed.

In a further subsidiary aspect, the pipe may be coated and/or sleeved to ensure the protection from any resulting fire.

The method also envisages the provision of a relatively long length of solid wall polyethylene pipe which is extruded in one continuous length in order to minimise the potential for a fusion weld of failing in service. Polyethylene pipe with a number of sections joined together with fusion welds may also be envisaged. The provision of polyethylene or other polymeric material is particularly advantageous in terms of resisting shipping impact, shockwaves from an explosion or bad weather conditions during use.

In a further subsidiary aspect, mechanisms to minimise the spillage over the pipe may be suspended from the pipe below the floating surface in order to aid containment and collection of spilled product and to assist in the maintenance of the pipe in the correct location.

The method also envisages extensions and/or additions to the installed or deployed polymeric pipe allowing the apparatus to cope with changing circumstances during an incident or accident requiring spill containment.

Specialist valves, valve configurations and control systems have also been included in the design to ensure that the pipe could be responsive to the nature of the incident.

Specialist valves may be provided as part of the pipe through which air or inert gas might be blown into the pipe. A PIG or a series of specially designed PIGs may be incorporated within the design of the pipe to aid its controlled surfacing. The surfacing might be controlled using the "S" bend principle. Weights or other stabilising devices may also be employed to assist in the deployment of the apparatus. The pipe may be filled with a dispersant which could be released as the pipe is floated.

Once the spill containment apparatus is no longer required it could be re-set by sinking below the water around the target structure. The air or an inert gas could then be replaced by seawater or a dispersant as required by the target structure operator using the specialist valves, valve configurations and control systems. A PIG or series of specially designed PIGs may be incorporated within the design of the apparatus to aid its controlled re-sinking using, for example, the "S" bend principle. Weights or other stabilising devices may be used to assist in its re-set.

In a further subsidiary aspect, said apparatus incorporates an inflatable inner tube.

In a further subsidiary aspect, said apparatus comprises an anchoring tether.

In a further subsidiary aspect, said apparatus comprises an annular region which is located between said pipes; said region incorporating dispersants and/or bioremediation and/or treatment agents.

In a further subsidiary aspect, said apparatus comprises an inner and an outer pipe; a valve being provided between said inner and outer pipes.

In a further subsidiary aspect, said valve is a one-way valve.

In a further subsidiary aspect, said pipe incorporates heating means.

In a further subsidiary aspect, said pipe has an outer diameter of 400 mm to 2500 mm.

DETAILED DESCRIPTION OF THE FIGURES

Figure 1:
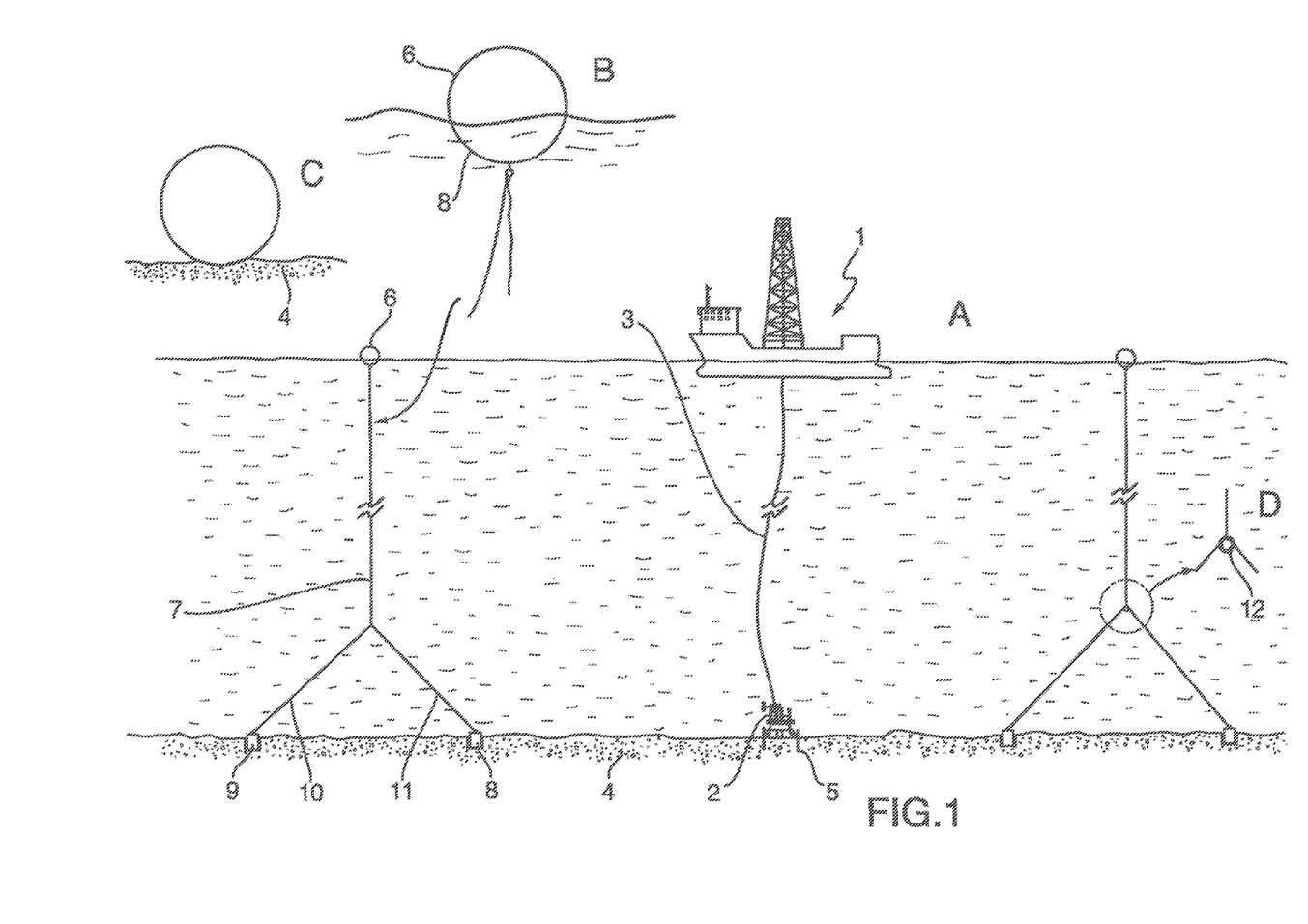
FIG. 1 shows an embodiment of an apparatus deployed and tethered in close proximity to an off-shore rig.

In FIG. 1 an offshore drilling vessel 1 is located in close proximity to a submerged resource extracting structure 2. A conductor for a resource extracting pipeline extends between the resource extracting structure 2 and the vessel 1. The resource extracting structure is anchored into the sea bed by virtue of anchor 5 and the like. A polymeric pipe 6 extends about the offshore vessel at an appropriate distance to cater for the containment of a particular kind of spillage. In a preferred embodiment the pipe forms a complete circle around the vessel 1. Alternatively, the pipe may form a horseshoe shape or other appropriate shape allowing the access to a spillage containment area within the limits set by the pipe. One particularly advantageous formation would be to deploy the pipe of this embodiment or of any other embodiment in a maze formation so that a plurality of pipe portions are provided in close proximity or as a succession to further improve the containment level. The pipe may float on the surface of the water as seen in both views A and B. Part of the pipe would be submerged in order to act as a barrier for the containment of a spill. View A of FIG. 1 shows a pipe 6 in its deployed configuration. In this mode of operation the pipe is tethered to the sea bed by a tether 7 extending from the lower portion 8 of pipe 6 towards one or more sea bed anchoring points such as points 8 and 9. Anchoring points 8, 9 incorporate a heavy duty weight of concrete or other appropriate material. These may either be on the sea bed or embedded within the sea bed. Tether 7 forks out into a number of branches 10 and 11 which correspond to various anchor points. As shown in view D the various portions of the tether may be held together by a common ring-shaped member 12.

In a further mode of operation as shown in view C the pipe may be located against the sea bed floor prior to deployment. Therefore, in its passive mode of operation the pipe may be located in a position out of the way of vessels.

Figure 2:
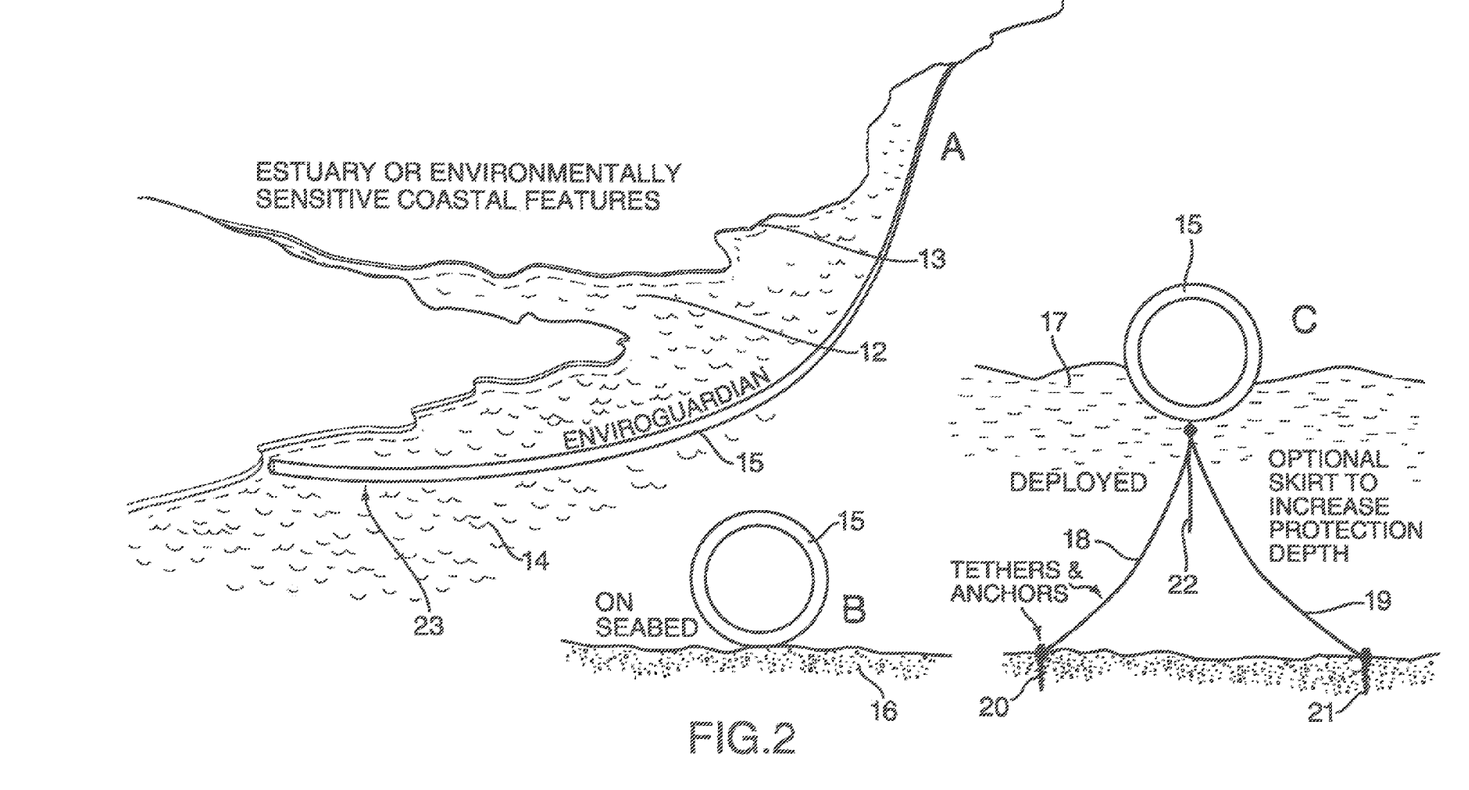
FIG. 2 shows an embodiment of an apparatus deployed at an estuary.

FIG. 2 shows a pipe deployed in view A across an estuary 12 formed between the coast 13 and the sea 14. Pipe 15 may be located on the seabed 16 as shown in view B. Alternatively, when deployed, pipe 15 may float on the surface 17 whilst a number of tethers 18 and 19 extend between the lower portion of pipe 15 to respective anchors 20 and 21 in the sea bed. An optional skirt extends from the lower portion of pipe 15 downwards towards the sea bed in order to increase the protection depth. The pipe may also be deployed to a variety of lengths by employing a plurality of pipe sections attached together by connectors. As a further embodiment, the end portion 23 of pipe 15 may be telescopic to facilitate the retraction of at least a portion of a pipe so that vessels may pass across the barrier.

Figure 3:
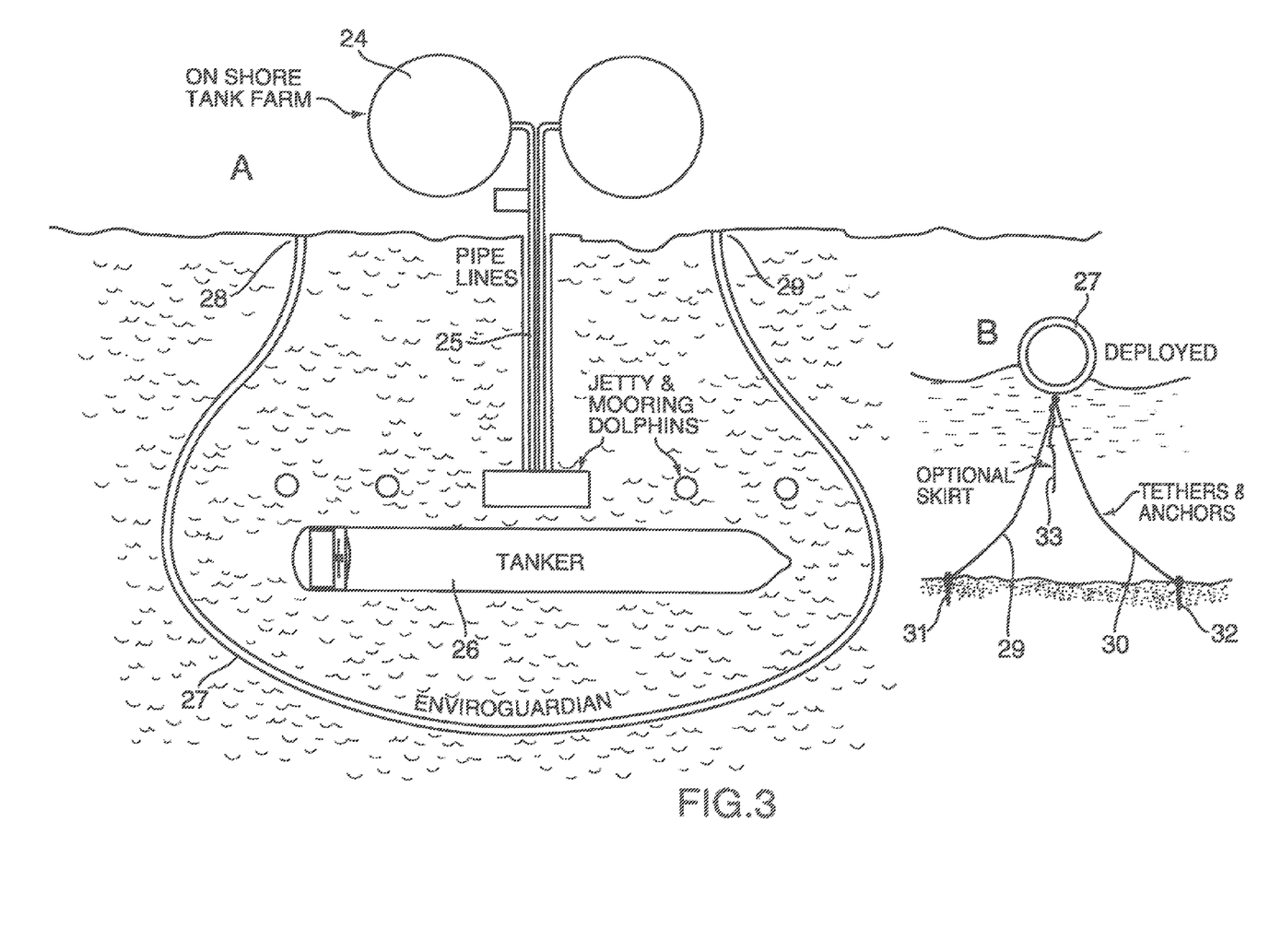
FIG. 3 shows an embodiment of an apparatus deployed in the vicinity of a tanker.

FIG. 3 shows an on-shore tank farm 24 with a number of pipe lines 25 extending towards a tanker 26. A number of jetties, moorings and dolphins are provided. A spillage containing pipe 27 extends from a first coastal attachment point 28 to a second coastal attachment point 29. The pipe is configured substantially as a horse shoe in order to prevent any potential spillage from spreading beyond the area defined by the pipe. As seen in view B, the pipe 27 floats on the surface and may be tethered by tethers 29 and 30 to anchor points 31 and 32. An optional skirt extends beneath the pipe 27. The skirt may be provided between tethers 29 and 30 so that the tethers may not only retain the pipe in its position but also serve to limit any travel of the skirt 33.

Figure 4:
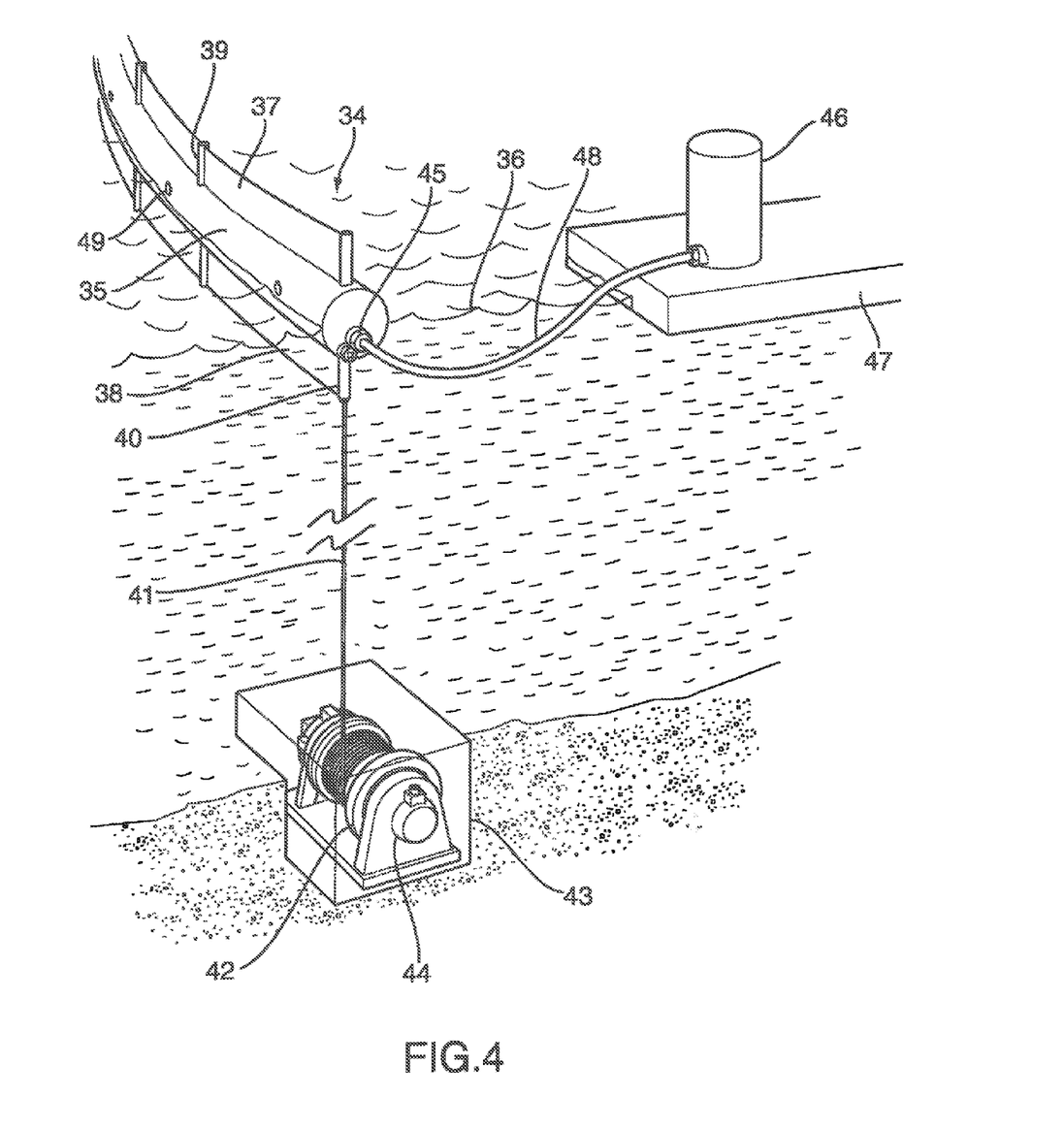
FIG. 4 shows a perspective view of a spill containment apparatus in accordance with a further embodiment of the invention.

FIG. 4 shows a spillage containing apparatus generally referenced 34 comprising a tubular 35 floating on the surface of the sea 36. Tubular 35 may optionally incorporate both an upper and a lower skirt respectively referenced 37 and 38. The invention envisages the provision of either an upper or a lower skirt dependent upon particular applications. A number of upright tubulars such as tubular 39 are provided to hold skirt 37 in a desired position. Upright tubular 40 also attaches to a tether 41. In order to displace the tubular 35 a winch 42 is provided. Winch 42 is provided with an appropriately sized housing 43. An electric motor 44 may be provided to drive the displacement of the tether 41. Tubular 35 may be filled with sea water. A valve 45 may allow the sea water to be extracted from the tubular by a pumping station 46. The pumping station may incorporate a floating platform 47. A hose 48 may be provided between cylinder 46 and valve 45. Instead of extracting sea water from the tubular, the pumping station may be provided to pump chemicals into the tubular. Alternatively, a pumping station may be employed to extract chemicals from the tubular and appropriately disperse them in the containment area. A plurality of such pumping stations may be employed at a number of locations along a spillage containment perimeter. A number of outlets 49 may be provided along the length of the tubular 35 so that the tubular itself may serve as a vehicle to disperse chemicals and/or the seawater that it contains.

Figure 5:
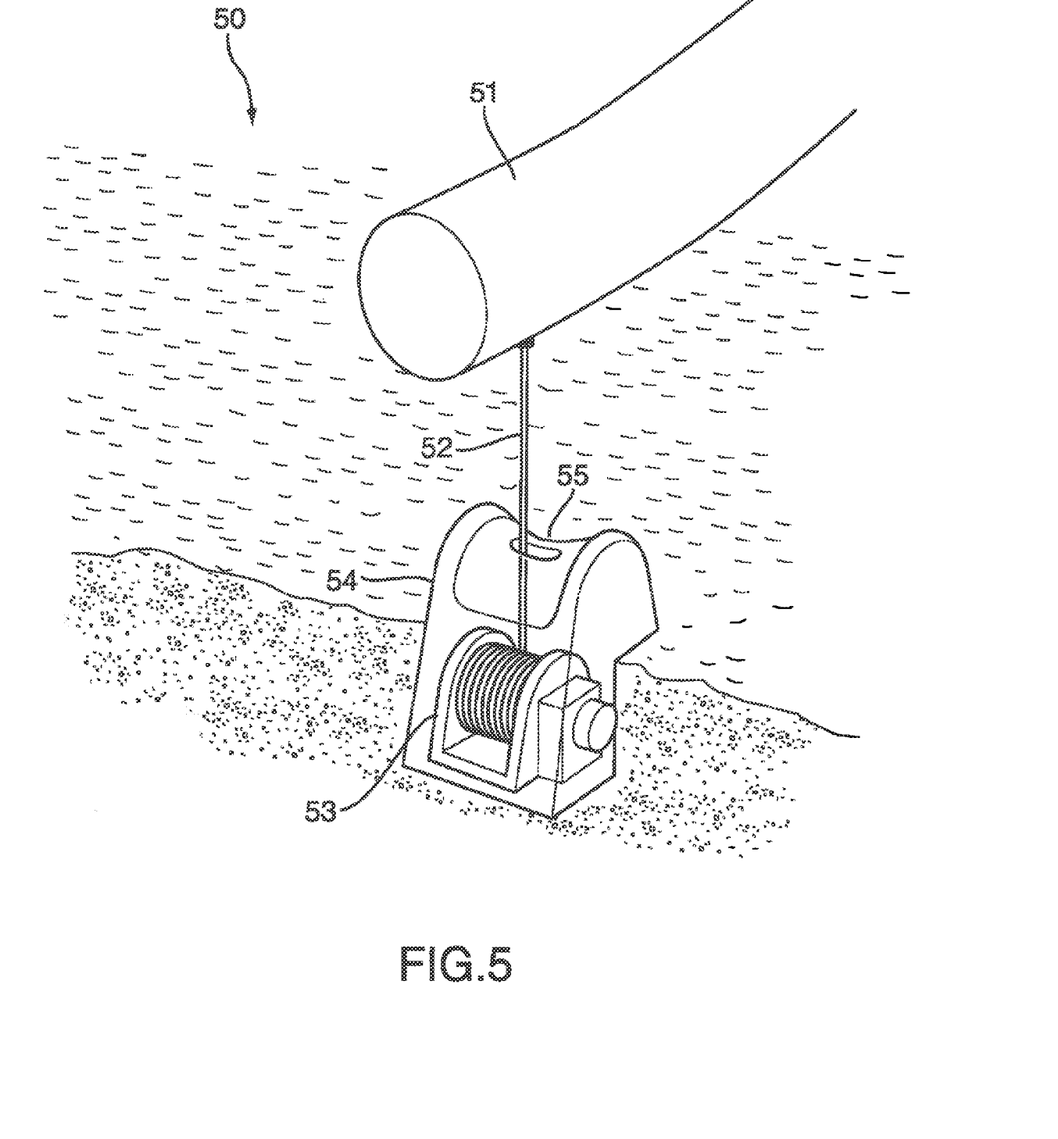
FIG. 5 shows a perspective view of a spill containment apparatus in accordance with a further embodiment.
Figure 6:
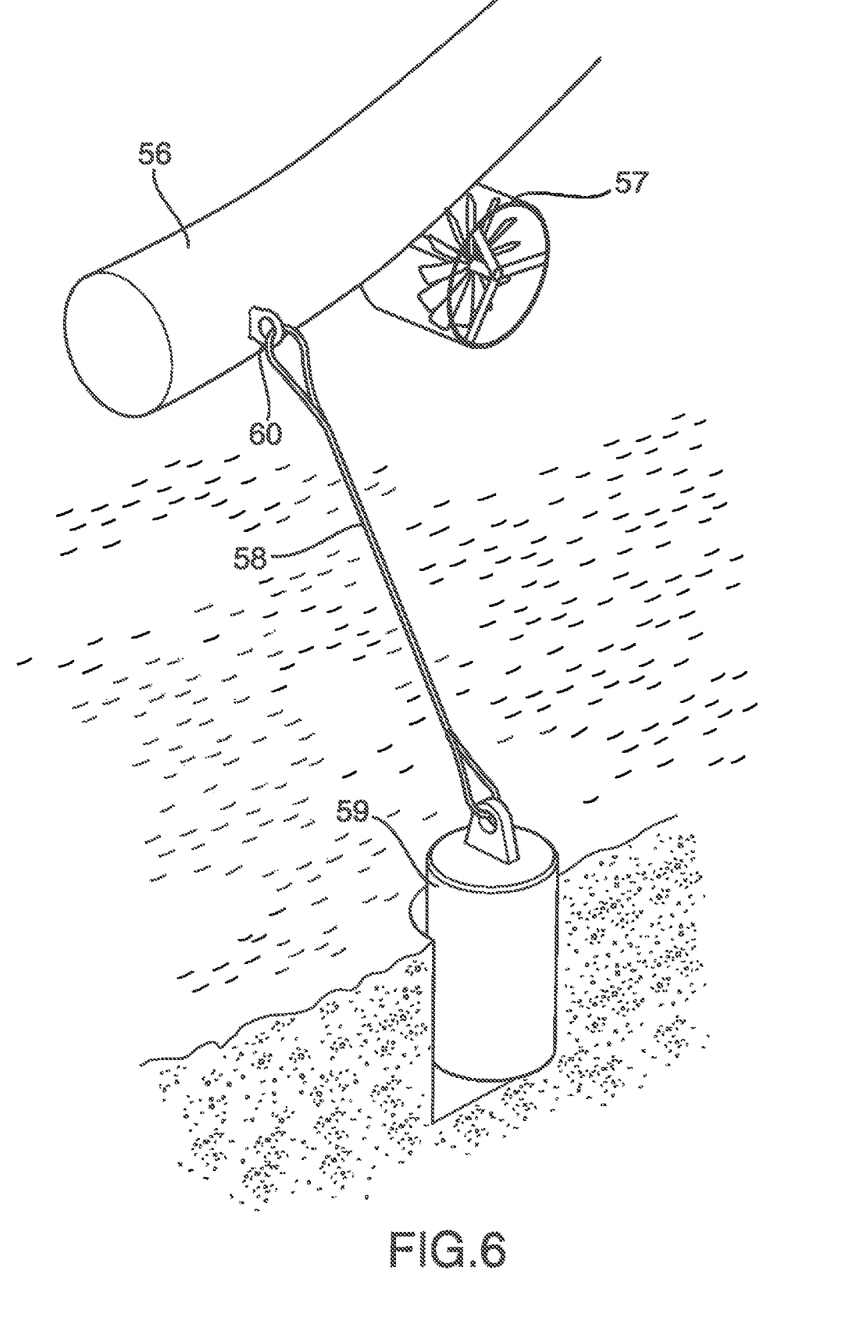
FIG. 6 shows a perspective view of a spill containment apparatus in accordance with a further embodiment.

FIG. 5 shows a spill containment apparatus 50 with a tubular 51 and a tether 52. In a similar fashion as the previous embodiment, a winch 53 may be provided to secure tubular 51 in its desired position. Tubular 51 may incorporate a substantially empty tube which would therefore readily float to the surface. Alternatively, the tubular may be buoyant whilst being filled with appropriate chemicals and even with an amount of sea water. The winch may be wirelessly controlled. The winch may be provided in a housing 54. Housing 54 may incorporate an upper bowed surface 55 in order to provide a surface against which the tubular may rest slightly above the sea bed in its retracted position. In order to deploy the tubular, instructions may be sent to the winch remotely and by releasing the winch in a controlled manner, the tubular may rise into its deployed position. Whilst both the embodiments of FIGS. 4 and 5 have shown the provision of a winch as a means for controlling the position of the tubular between its deployed position and its retracted position other means of displacing the tubular are envisaged. A dynamic positioning system may be deployed on each one of the embodiments. For example as shown in FIG. 6 tubular 56 may be displaced by a propeller unit 57. The propeller unit may be suitable for displacing the tubular in any selected direction in order to more accurately position the tubular. For example the propeller unit may be employed to counteract the effects of currents. Optionally, the propeller unit itself may be used to displace the tubular from its deployed position to its retracted position. A tether 58 may be provided between a sea bed engaging bollard 59 and a tubular attachment ring 60. In addition to the propeller unit or other similar positioning unit, a global positioning system may be employed to precisely locate the tubular and adjust its position when necessary.

In any of the embodiments envisaged, the system may further comprise a global positioning system (GPS) which may be part of the boom. The system may therefore be deployed under its own power from a base where boom sections might be stored. These sections might for example be equipped to travel significant distances 100 km. This may for example travel as an underwater drone. The sections may for example travel underwater in order not to be affected by certain kinds of adverse weather conditions. The boom may also be fitted with wave powered generators charging onboard batteries allowing the system to remain deployed as long as is necessary (e.g. until the spillage is cleared).

Figure 7:
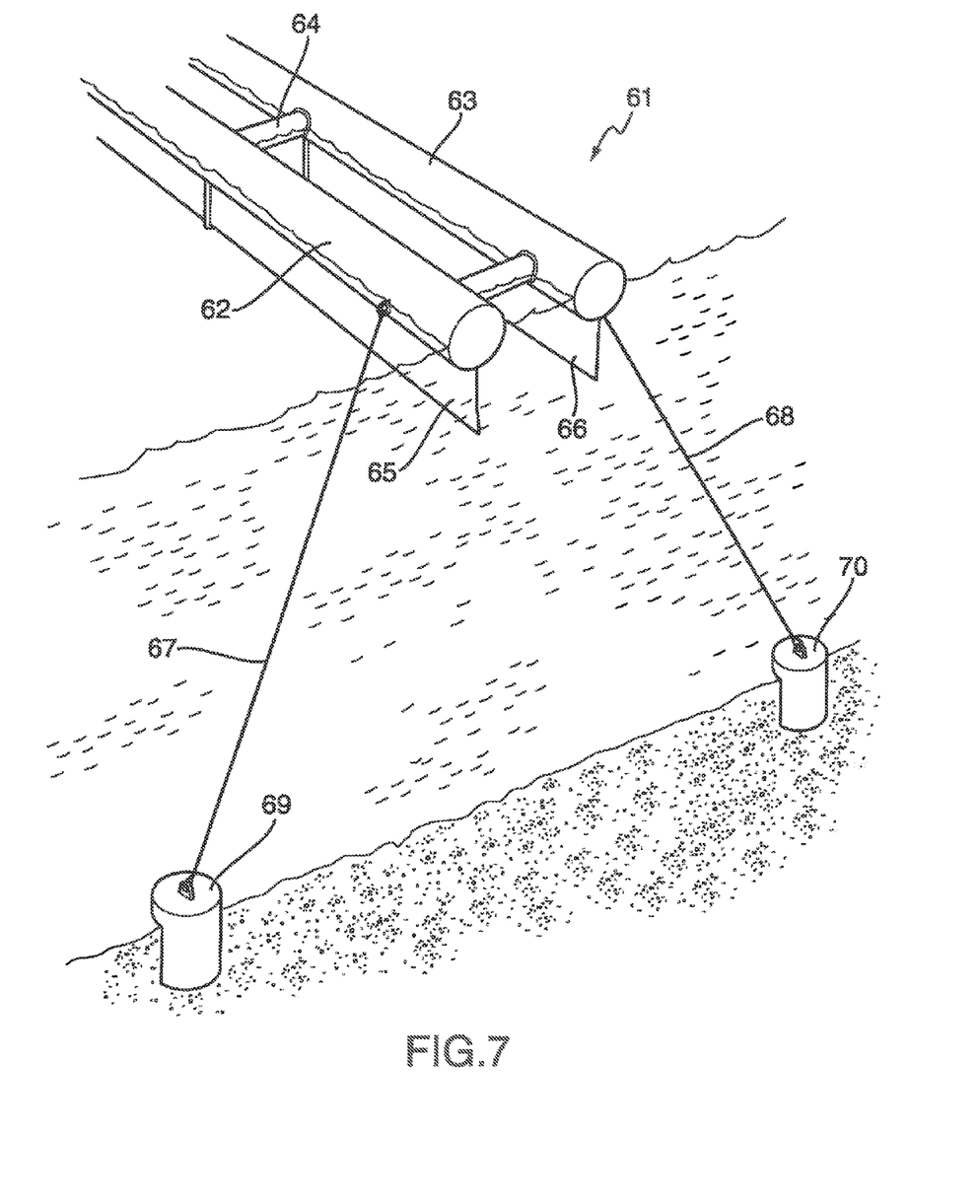
FIG. 7 shows a spill containment apparatus in accordance with a further embodiment.

FIG. 7 shows a spillage containment apparatus 61 formed as a succession of tubulars 62 and 63. The tubulars 61 and 63 may be joined together by cross beams 64 in order to space one tubular relative to a neighbouring tubular. As in previous embodiments, the tubulars may incorporate a downwardly projecting skirt 65 and 66. Each one of the tubulars may be tethered on to the sea bed via tethers 67 and 68 which attach to bollards 69 and 70 which may be partially embedded into the sea bed.

Figure 8:
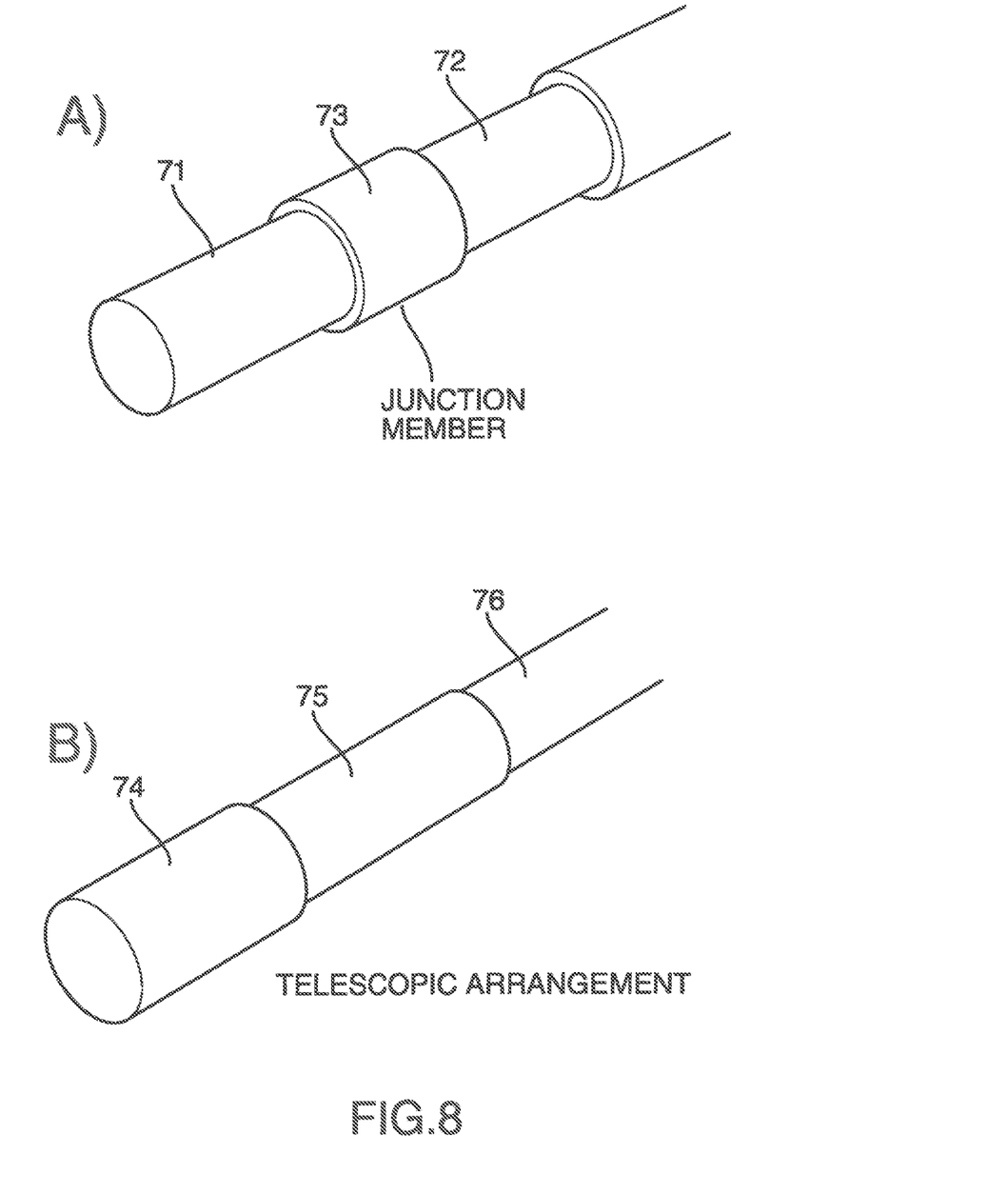
FIG. 8A shows a spill containment apparatus incorporating a number of junction members whilst
FIG. 8B shows a spill containment apparatus in the form of a telescopic arrangement.

FIG. 8A shows a tubular formed by a number of tubular portions 71 and 72. A junction member 73 may be provided between adjacent tubular portions. This allows the tubular to be formed in a particular length. FIG. 8B shows a further tubular formed or including a succession of tubular portions 74, 75 and 76 which allow the length of a tubular to be telescopically adjusted.

Additional Aspects

The system is designed to be cost effective, particularly as a % of the total cost of a structure development, such as an oil rig.

The decision to deploy as either a response to an incident or as an insurance when an incident is judged to be possible, is minimal and this would make its deployment more likely and so minimise any environmental impact that may have occurred if it had not been deployed. Also, if it is deployed during a false alarm the system does not affect the on-going production of the well so the cost to the operator in a false alarm situation is low.

An additional feature is that the system can be tested at a low cost and on a regular basis as part of a critical incident plan, a likely requirement by all governments, operating companies, statutory regulatory bodies and insurance companies.

The maintenance costs once the system is in place in its standby guardian status may be minimal.

The apparatus is particularly advantageous since in some embodiments it has the effect of reducing the wave height inside the boom when compared to the wave height outside of the boom.

In a preferred embodiment, air is contained in the apparatus.

The invention claimed is:

1. A method of containing a spill in an aqueous environment, comprising the steps of:
    placing an inherently buoyant polymeric pipe under the surface level of said aqueous environment in the vicinity of a site of potential spillage;
    holding said pipe under the surface level against its buoyancy by employing one of a tether, a ballast or a propeller; and
    raising said pipe under the effect of its buoyancy from under the surface level to a containment level;
    wherein said pipe forms, when raised, at least a partial boundary around said spill for containing said spill, and wherein said pipe is displaced by a propeller unit.

2. A method according to claim 1, wherein said pipe incorporates a global positioning system.

3. A method according to claim 1, wherein said pipe is disposed to form a ring around a site of potential spillage.

4. A method according to claim 1, wherein said pipe contains at least in part, one of dispersants, bioremediation or treatment agents serving to do one of disperse, biodegrade or treat spills, and wherein said method comprises the steps of storing said agents in said pipe and distributing said agents from said pipe to said spillage site.

5. A method according to claim 1, comprising the step of deploying a skirt.

6. A method according to claim 1, comprising the step of extruding said pipe in one continuous length.

7. A spill containment apparatus for use in an aqueous environment, comprising:
    a polymeric pipe of a diameter greater than 300 millimeters;
    said pipe being of sufficient length to form a containment boundary;
    a propeller for holding said pipe under the surface level of said aqueous environment; and
    a controller for controlling said propeller in order to place said pipe at the surface level of said aqueous environment.

8. An apparatus according to claim 7, wherein a continuous length of said polymeric pipe forms an arc.

9. An apparatus according to claim 7, wherein a continuous length of said polymeric pipe forms a ring.

10. An apparatus according to claim 7, wherein said pipe incorporates a proximal and a distal extremity with corresponding closure caps.

11. An apparatus according to claim 7, wherein said pipe incorporates a fire retardant coating.

12. An apparatus according to claim 7, wherein a skirt is provided.

13. An apparatus according to claim 7, wherein said pipe forms a ring with an opening means at a location of said circumference for opening said ring.

14. An apparatus according to claim 7, wherein said apparatus incorporates a plurality of rings of pipe located concentrically.

15. An apparatus according to claim 7, wherein said apparatus incorporates a plurality of pipes at least one of which being located radially within another.

16. An apparatus according to claim 7, wherein said apparatus comprises an anchoring tether.

17. An apparatus according to claim 7, wherein said pipe has an outer diameter of 400 mm to 2500 mm.

18. An apparatus according to claim 7, wherein the polymeric pipe is of polyethylene (PE).

19. An apparatus according to claim 7, wherein the pipe is of PE100.

20. An apparatus according to claim 7, wherein the pipe is of polyethylene and has a solid wall with a density of 0.95 to 0.96 kg/dm3.

* * * * *